Figure 1:
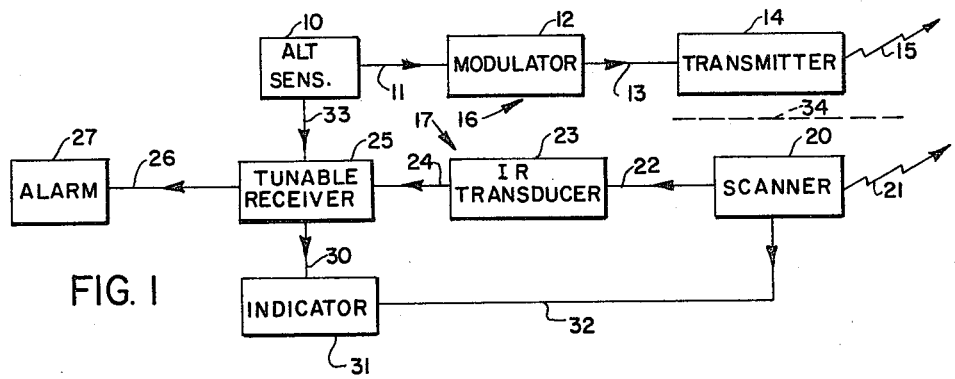

March 19, 1963     O. H. SCHUCK     3,082,324

AERONAUTICAL APPARATUS AND METHOD

Filed Aug. 27, 1959     2 Sheets-Sheet 1

INVENTOR
OSCAR HUGO SCHUCK
BY
ATTORNEY

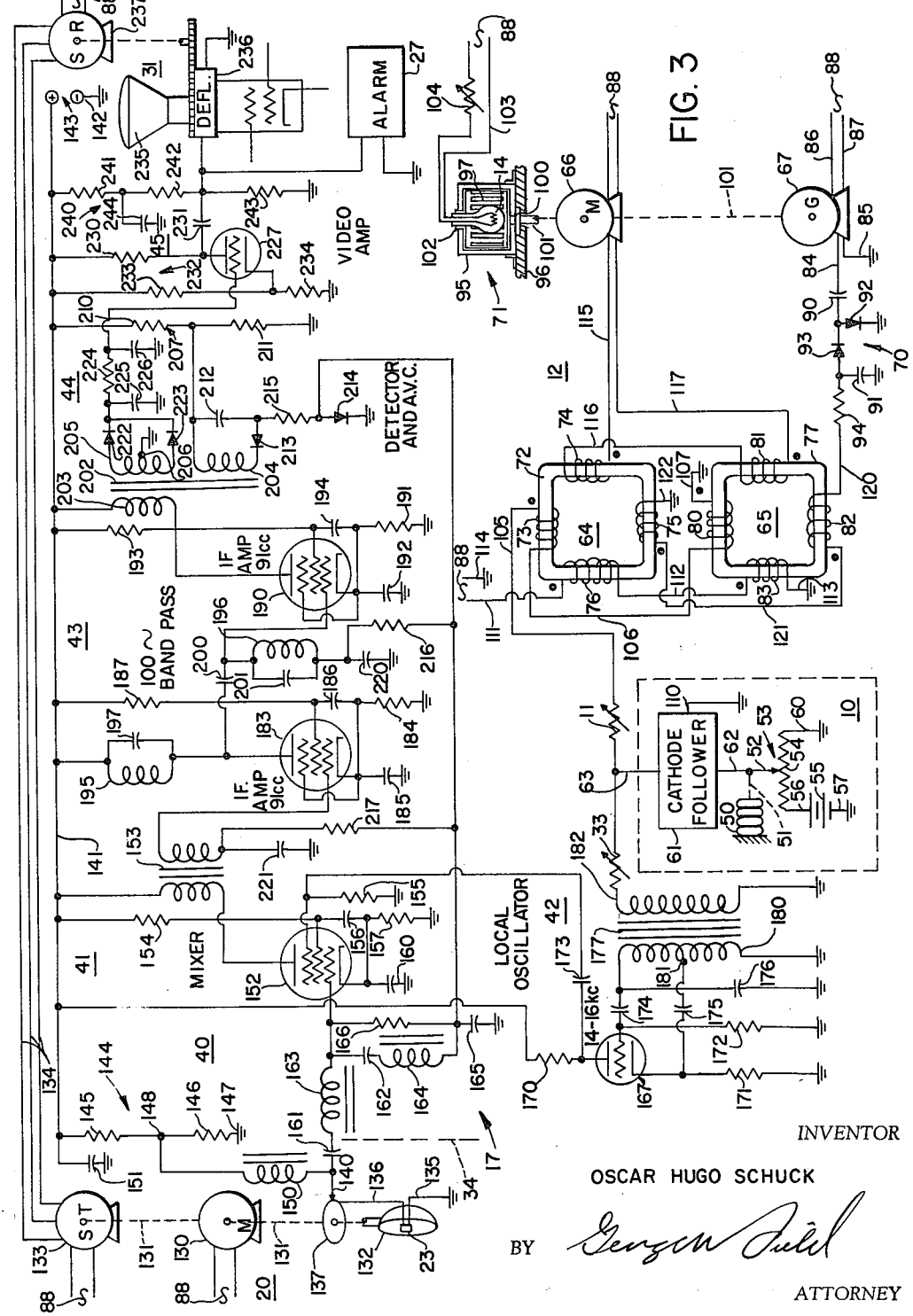

United States Patent Office 3,082,324
Patented Mar. 19, 1963

3,082,324
AERONAUTICAL APPARATUS AND METHOD
Oscar Hugo Schuck, Minneapolis, Minn., assignor to Minneapolis-Honeywell Regulator Company, Minneapolis, Minn., a corporation of Delaware
Filed Aug. 27, 1959, Ser. No. 836,372
9 Claims. (Cl. 250—83.3)

This invention relates to the field of aeronautics, and more particularly to aircraft equipment for use in reducing the danger of mid-air collisions by giving warning to the pilot of an aircraft of the presence of other craft in hazardous relation with respect to him. The invention comprehends not only the equipment used, but the inventive concept or method on which the equipment is predicated.

In air navigation there is an increasing problem of mid-air collisions between aircraft, particularly in the densely populated air space surrounding airports. Considering the facts surrounding the collisions and near misses which are known to have occurred, it becomes apparent that the majority of them happen on clear days, and are due to the fact that the pilots of the aircraft in question became aware of each other's presence in a common danger relationship too late to take successful evasive action, or barely in time to do so. Visibility from the cockpit of many modern aircraft is considerably restricted, and closing speeds are continually increasing; these facts combined with the known tendency of the human being to become tired, bored or careless lead to a very dangerous state of affairs, and one to the alleviation of which automatic apparatus is peculiarly well adapted.

An object of the present invention is to reduce the likelihood of collisions and near misses by providing a new method and novel apparatus for warning the pilot of an aircraft of the presence of other aircraft in dangerous special relation to him. More specifically, it is another object of the invention to provide means for indicating the presence of intruding aircraft within a predetermined range from an observing aircraft and means for suppressing the indication of all intruding aircraft which are not at substantially the same altitude as the observing aircraft. A further object of the present invention is to provide a novel method of decreasing collision hazards which includes the concept of selectively indicating to an aircraft pilot, of the positions of all surrounding aircraft, only the positions of those aircraft which are at effectively the same altitude with him.

Various other objects, advantages, and features of novelty not particularly enumerated above which characterize my invention are pointed out with particularity in the claims annexed hereto and forming a part hereof. However, for a better understanding of the invention, its advantages, and objects attained by its use, reference should be had to the sub-joined drawing, which forms a further part hereof, and to the accompanying descriptive matter, in which I have illustrated and described a preferred embodiment of my invention.

Figure 2:
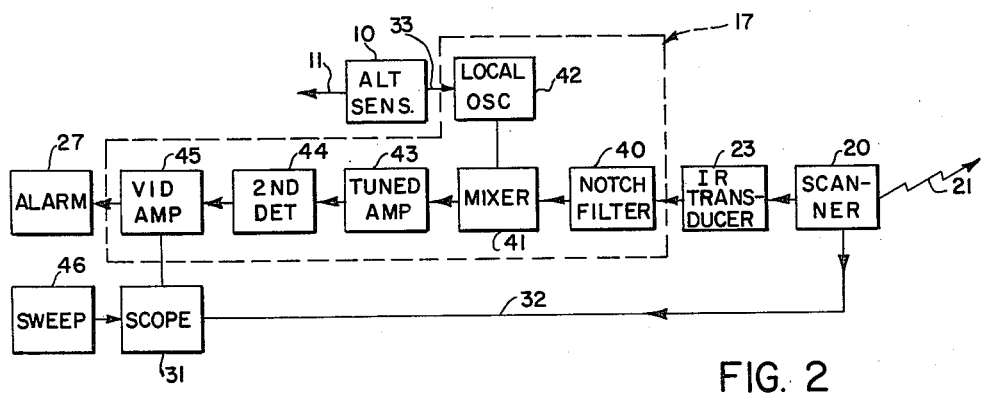
Figure 4:
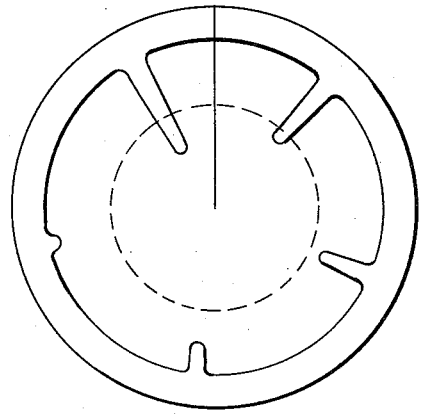

In the drawing, FIGURE 1 is a general block diagram of a system according to the invention, FIGURE 2 is a more detailed block diagram of the receiver portion of FIGURE 1, FIGURE 3 is a schematic wiring diagram of an embodiment of the invention shown in FIGURE 2, and FIGURE 4 is a sketch illustrative of a typical indication given by the equipment.

In FIGURE 1, reference numeral 10 refers to an altitude sensing arrangement which supplies a first signal at 11 and is effective through suitable means indicated by the reference numeral 12 to modulate as at 13 the infrared output of a transmitter 14, the modulated infrared signal being radiated into space as shown at 15. The elements thus far described make up a transmitter identified by the general reference numeral 16.

The equipment is also shown to include a receiver indicated by the general reference numeral 17, and includes a scanner 20 adapted to receive infrared signals as indicated at 21 and supply them at 22 to an infrared transducer 23 such as a lead sulfide cell. The output 24 from transducer 23 is supplied to a tunable receiver 25 which supplies a first output 26 to a first utilization device comprising an alarm device 27, and a second output 30 to a second utilization device comprising an indicator 31 which is coordinated with scanner 20 by a suitable connection 32. A second signal 33 is supplied from altitude sensor 10 to tune receiver 25. Suitable means indicated by the dash line 34 are provided for shielding scanner 20 from transmitter 14.

The operation of the system is such that the aircraft carrying the equipment continuously transmits omni-directionally from transmitter 14 a signal which is modulated in accordance with the altitude of the aircraft. Scanner 20 is simultaneously scanning through 360 degrees in azimuth, and a circular sweep is likewise supplied to indicator 31 which may preferably be of the cathode ray oscilloscope type. Whenever an infrared signal as 21 is received by scanner 20 and passed to transducer 23, an electrical signal, pulse modulated at a frequency determined by the altitude of the distant aircraft, is supplied to receiver 25, for energizing alarm 27 and indicator 31. The receiver however is tuned by altitude sensor 10 in accordance with the altitude of the receiving aircraft, and receiver 25 accordingly acts to suppress any signals from transducer 23 which are not modulated in accordance with the altitude of the observing aircraft. This means that only signals from aircraft at substantially the same elevation as the observing aircraft will cause indications on indicator 31, and the pilot is relieved of the necessity of observing indications which have no hazard content.

FIGURE 2 is a more complete block diagram of a practical receiver, the wiring diagram of which will presently be discussed. In FIGURE 2 the signal from transducer 23 is supplied through a notch filter 40 to a mixer 41, and the output 33 from altitude sensor 10 controls a local oscillator 42 which supplies a second signal to mixer 41. The intermediate frequency output from mixer 41 is supplied through a tuned amplifier 43 to a second detector 44, and thence is supplied to alarm 27 and indicator 31 through a video amplifier 45. A suitable sweep generator 46 is provided for causing the trace on oscilloscope 31 to assume a circular form in the absence of any signal from amplifier 45. While FIGURE 2 shows alarm 27 and scope 31 as independent, it is convenient to combine the two functions as will presently be described.

FIGURE 3 is a schematic diagram of a specific embodiment of the invention shown generally in FIGURE 1. Altitude sensor 10 is shown to comprise an expansible bellows 50 exposed to the air ambient to the aircraft in such a fashion that it changes in length with changes in the air pressure and hence with changes in the altitude of the aircraft. Bellows 50 acts through a mechanical connection 51 to displace the slider 52 of a voltage divider 53 with respect to a winding 54 energized with direct voltage from a suitable source 55 such as a battery through conductor 56 and ground connections 57 and 60. Since the devices which are to be controlled in accordance with the voltage on slider 52 are current-actuated devices, an impedance matching or isolating device is provided in the form of a cathode follower 61, having an input conductor 62 and an output conductor 63.

Modulator 12 is shown in FIGURE 3 to include as principal components a first saturable transformer 64, a second saturable transformer 65, a D.C. motor 66, a velocity generator or dynamic transformer 67, a rectifier and filter 70, and as shutter mechanism 71.

Transformer 64 includes a saturable core 72 and a plurality of windings 73, 74, 75, and 76. Transformer 65 includes a saturable core 77 and a plurality of windings 80, 81, 82 and 83.

Motor 66 is of the type which operates on pulsating D.C., at a speed proportional to the energy supply thereto.

Velocity generator 67 supplies between an output conductor 84 and a ground connection 85 an alternating voltage of the frequency of the voltage supplied at a pair of input terminals 86 and 87, which varies in amplitude with the speed of rotation of the velocity generator, and which reverses in phase with reversal in the direction of rotation of the velocity generator.

Rectifier filter 70 includes a first capacitor 90, a second capacitor 91, a first rectifier 92, a second rectifier 93, and a resistor 94.

Shutter assembly 71 includes an outer, axially slotted drum 95 which is fixed to a suitable supporting surface 96, and an inner drum 97 having the same number of axial slots as drum 95, and mounted in a bearing 100 for rotation by the shaft 101 of motor 66.

Transmitter 14 is shown to comprise an incandescent lamp bulb mounted in a suitable socket 102 in the top of drum 95, and energized through conductor 103 and a dimmer resistor 104 from the source of alternating voltage 88 which energizes velocity generator 67.

The connection 11 between altitude sensor 10 and modulator 12 is shown in FIGURE 3 to comprise a variable resistor.

In the manufacture of the coils for transformers 64 and 65, they are all wound in the same direction, and the convention is followed in the drawing of applying a dot near the end of the winding at which the winding was begun. The following further convention will be used in describing the circuitry in connection with these transformers. When a circuit is being traced through the winding from the start end to the finish end the circuit will be recited as forward and when the circuit is going through the coil in the opposite direction it will be recited as backward.

A signal circuit may be traced from output conductor 63 of cathode follower 61 through resistor 11, conductor 105, forward through winding 73, conductor 106, backward through winding 80, and ground connections 107 and 110. A circuit may be traced from alternating source 88 through conductor 111, forward through winding 76, conductor 112, forward through winding 83, and ground connections 113 and 114 back to source 88. An energizing circuit for motor 66 can be traced from the motor through conductor 115, forward through winding 74, conductor 116, backward through winding 81, and conductor 117 back to motor 66. A bias circuit may be traced from resistor 94 through conductor 120, backward through winching 82, conductor 121, forward through winding 75, and ground connections 122 and 85. Resistor 94 supplies a negative direct voltage, determined in magnitude by the rate of rotation of velocity generator 67, by capacitor 90 and rectifiers 92, 93 acting as a voltage doubler, and capacitor 91 acting as a filter.

In the absence of direct voltages from cathode follower 61 and rectifier filter 70, transformers 64 and 65 act simply as a pair of ordinary transformers with their primary windings connected in series and their equal secondary windings connected to oppose: as a result no energy is supplied to motor 66, which does not operate. This is true whether or not cores 72 and 77 actually go into saturation, or merely approach it.

However, if a direct voltage is supplied from cathode follower 61 through windings 73 and 80, the arrangement is such that for a first half cycle of source 88 the flux due to the direct current aids the flux due to the alternating current in one transformer, thus increasing its extent of saturation, and opposes the flux due to the alternating current in the other transformer, thus reducing its saturation. The transformer output voltages are no longer equal, and a pulse of energy is supplied to motor 66 tending to cause it to rotate. During the next half cycle of the alternating voltage, the direct voltage flux aids the alternating voltage flux in the opposite transformer to that formerly affected, so that its saturation is increased, and similarly the saturation of the other transformer is decreased. Thus an output of the opposite sense is provided from the two transformers, but because of the reverse connection between the secondary windings, the direction of current flow through the motor 66 is the same as before, continuous operation of motor 66 in one direction accordingly takes place.

When motor 66 operates, velocity generator 67 supplies an output between conductor 84 and ground connection 85, which results in a D.C. voltage on conductor 120. The resulting flow of current in windings 82 and 75 produces magnetic flux in the two cores of a sense to oppose the flux resulting from the signals from cathode follower 61, and thus reduces the voltage supplied to motor 66. However, the velocity generator voltage cannot completely nullify the signal voltage, because in that event operation of motor 66 would stop and the velocity generator voltage would be cut down. An equilibrium condition is reached in which the speed of the motor continues at a uniform rate just sufficient to supply from the transformers electrical energy sufficient to maintain operation at that rate. By changing the voltage supplied by cathode follower 61 a new equilibrium condition is reached in which the motor operates at a new speed. The arrangement is thus an accurate speed control for motor 66.

Operation of motor 66 rotates inner drum 97 within outer drum 95, and the movement of the shutter slots causes intermittent bursts of light to be projected from the lamp 14 in all directions. The rate of repetition of the flashes of light is determined by the speed of motor 66, and the intensity of the flashes may be set to a standard value by adjustment of rheostat 104.

Turning now to receiver 17, scanner 20 is shown to comprise a motor 130 energized from source 88 and operating through a shaft 131 to continuously rotate a preferably parabolic reflector 132 about a normally vertical axis, and to drive a synchro transmitter 133 also energized from source 88 and supplying a signal on conductors 134.

Transducer 23 in the form of a lead sulfide cell is mounted at the focus of reflector 132. One terminal of the cell is grounded as by ground connection 135 and the other terminal is connected by conductor 136 to a slip ring 137 engaged by a brush 140. An anode bus 141 is maintained at a positive voltage of 250 volts with respect to ground connection 142 by any conventional source indicated at 143. A voltage divider 144 made up of resistors 145 and 146 in series is connected across from anode bus 141 to ground connection 147, and the common terminal 148 between resistors 145 and 146 is connected to brush 140 through an inductance 150, to supply bias voltage for cell 23. A filter capacitor 151 is connected across the voltage divider.

Mixer 41 is shown in FIGURE 3 to comprise a pentode 152 of the variable mu type, together with an output transformer 153, a screen grid dropping resistor 154, a suppressor grid resistor 155, a screen grid bypass capacitor 156, a cathode resistor 157, and a cathode bypass capacitor 160. Brush 140 is connected to the control grid of pentode 152 through a notch filter including capacitors 161 and 162 and inductors 163 and 164. The notch circuit connection to ground is completed through AVC filter capacitor 165, and the AVC circuit to the control grid of the mixer tube is completed through a resistor 166.

Local oscillator 42 is shown to comprise a triode 167 with which there are associated a plate resistor 170, a cathode resistor 171, a grid resistor 172, coupling capacitors 173, 174 and 175, a tuning capacitor 176, and a transformer 177 having a first winding 180 tapped at 181 and a second winding 182. Transformer 177 is so constructed that the inductance of winding 180 may be varied by varying the current in winding 182. Connection 33 of FIGURE 1 is shown in FIGURE 3 to comprise a variable resistor.

Mixer 41 is followed by a two stage intermediate frequency amplifier 43 comprising a first pentode 183 having a cathode resistor 184, a cathode bypass capacitor 185, a screen grid bypass capacitor 186, and a screen grid dropping resistor 187, and a second pentode 190 having a cathode resistor 191, a cathode bypass capacitor 192, a screen dropping resistor 193, and a screen bypass capacitor 194. A band pass filter between pentodes 183 and 190 is shown to comprise inductances 195 and 196 and capacitors 197, 200, and 201.

The output from pentode 190 is supplied through a transformer 202 having a primary winding 203, a first secondary winding 204 and a second secondary winding 205 having a center tap 206. Secondary winding 204 comprises a portion of a delay automatic gain control circuit including a voltage divider 207 made up of resistors 210 and 211 and energized from bus 141, and also including a capacitor 212, a pair of rectifiers 213 and 214, resistors 215, 216, and 217 and 166 and filter capacitors 220, 221, and 165.

Secondary winding 205 comprises a portion of a full-wave detector 44 which also includes diodes 222 and 223, resistor 224, and filter capacitors 225 and 226.

Detector 44 feeds a video amplifier 45 including a triode 227, a plate resistor 230, a coupling capacitor 231, and a cathode voltage divider 232 including resistors 233 and 234.

Indicator 31 is shown to comprise a cathode ray tube 235 having a rotatable deflection coil 236 driven by a synchro receiver 237 connected to conductors 134. A normal circular trace is maintained in oscilloscope 235 by connecting deflection coil 236 to a voltage divider 240 made up of resistors 241, 242, and 243 and filter capacitor 244.

Operation

In an operative system according to my invention, all the aircraft operating in a given area are assumed to be provided with the equipment shown in FIGURE 3. The arrangement is such that the repetition frequency of infrared pulses supplied by transmitter 14 varies from five thousand per second to seven thousand per second as the altitude of the transmitting aircraft varies from zero to 30,000 feet, while the frequency of local oscillator 42 is simultaneously changing from 14 kilocycles to 16 kilocycles. Scanner 20 may conveniently sweep at 60 revolutions per minute. Notch filter 40 is constructed to reject a frequency of 9000 cycles, which is the intermediate frequency, and the pass band in the intermediate frequency amplifier is adjusted to 100 cycles. Signals from all aircraft in the environment within range of the equipment are picked up by scanner 20 and are supplied through filter 40 to mixer 41 where they are combined with the signal from the local oscillator. The beat frequency is supplied to the intermediate frequency amplifier. Assume for the sake of argument that the receiving aircraft is flying at an altitude of 15,000 feet, which means that local oscillator 42 is operating at a frequency of 15 kilocycles. Any signal from scanner 20 having a frequency of 6 kilocycles beats with the local oscillator frequency to give a 9,000 cycle beat frequency which is transmitted through the intermediate frequency amplifier. The 100 cycle pass band of the intermediate frequency amplifier corresponds to an altitude spread of 1500 feet, so that the intermediate frequency amplifier transmits signals received at scanner 20 if they are in the frequency range between 5,950 to 6,050 cycles. This in turn corresponds to an altitude of the remote or transmitting aircraft between 14,250 and 15,750 feet.

The output of the intermediate frequency amplifier is detected at 44 to convert into a single pulse, amplified in amplifier 45, and is impressed as a pulse voltage on deflecting coil 236 of indicator 31. The orientation of reflector 132 and deflecting coil 236 is so initially set that when the reflector receives signals from dead ahead, for example, the radius along which the resultant displacement of the cathode ray beam takes place is straight upward. By this means the direction of reception of any pulse is made evident on the oscilloscope, and the amount of deflection of the beam from the base circle is a rough measure of the intensity of the signal and therefore of the distance between the two aircraft.

Alarm 27 may be any simple voltage responsive device. Whenever the intensity of the voltage output from amplifier 45 exceeds a predetermined value, alarm 27 operates to attract the attention of the pilot, so that he need not observe oscilloscope 235 continuously but only when alarm 27 operates.

FIGURE 4 is a face view of oscilloscope 235 giving a typical indication. It shows the presence of five aircraft in the environment, represented by five inwardly directed pulses away from the base circle of the oscilloscope. The figure shows a dotted circle indicating the intensity of signals at which alarm 27 operates, and it will be seen that the two upper pulses are of sufficient magnitude to operate the alarm. Aircraft whose altitudes differ from that of the observing aircraft by more than ±750 feet do not produce recognizable signal on the indicator.

Numerous objects and advantages of my invention have been set forth in the foregoing description, together with details of the structure and function of the invention, and the novel features thereof are pointed out in the appended claims. The disclosure, however is illustrative only, and I may make changes in detail within the principle of the invention, to the full extent indicated by the broad general meaning of the terms in which the appended claims are expressed.

I claim as my invention:

1. Collision warning equipment for aircraft comprising, in combination: a signal transmitter, means carried by a first aircraft for modulating the signal of said transmitter in accordance with the altitude of said first aircraft; a scanning signal receiver carried by a second aircraft; a utilization device; adjustable means connecting said receiver to said device for preventing all but a selected portion of any received signals from reaching said device; and means adjusting said adjustable means in accordance with the altitude of said second aircraft.

2. Collision warning equipment for aircraft comprising, in combination: an infrared radiator; means interrupting the radiation therefrom in accordance with the altitude of an aircraft; a scanning infrared signal receiver; a utilization device; adjustable means connecting said receiver to said device for preventing all but a selected portion of any received signals from reaching said device; and means adjusting said adjustable means in accordance with the altitude of an aircraft.

3. Collision warning equipment for aircraft comprising, in combination: a signal transmitter, means modulating the signal of said transmitter in accordance with the altitude of an aircraft; a scanning signal receiver; a utilization device; adjustable means connecting said receiver to said device for preventing all but a selected portion of any received signals from reaching said device; and means adjusting said adjustable means in accordance with the altitude of said aircraft.

4. Collision warning equipment for an aircraft comprising, in combinaton: a scanning transducer for receiving infrared signals; a utilization device; adjustable demodulator means connecting said transducer to said device for preventing all but a selected portion of any received signals from reaching said device; and means adjusting said adjustable means in accordance with the altitude of the aircraft.

5. A collision warning receiver comprising, in combination: a scanner continuously sweeping 360 degrees in azimuth; an infrared transducer in said scanner for giving an electrical output determined by the infrared input; a tunable network; means connecting said transducer to said network; a demodulator connected to said network; a cathode ray oscilloscope having a normally circular trace; means connecting said demodulator to said oscilloscope to cause radial displacement of said trace from said circle when said demodulator gives an output; and means tuning said tunable network in accordance with a variable quantity.

6. Collision warning apparatus comprising, in combination: a scanner continuously sweeping 360 degrees in azimuth; an infrared transducer in said scanner for giving an electrical output determined by the infrared input; a tunable heterodyne receiver; means connecting said transducer to said receiver, including means attenuating the beat frequency of said receiver; a demodulator connected to said network; a cathode ray oscilloscope having a normally circular trace; means connecting said demodulator to said oscilloscope to cause radial displacement of said trace from said circle when said receiver gives an output, and means tuning said receiver in accordance with altitude of an aircraft carrying said apparatus.

7. Collision warning apparatus comprising, in combination: a scanner continuously sweeping 360 degrees in azimuth; an infrared transducer in said scanner for giving an electrical output determined by the infrared input; a superheterodyne receiver including a tunable local oscillator; means connecting said transducer to said receiver; a demodulator; means connecting said demodulator to said receiver; a cathode ray oscilloscope having a normally circular trace; means connecting said demodulator to said oscilloscope to cause radial displacement of said trace from said circle when said demodulator gives an output; and means tuning said local oscillator in accordance with the altitude of an aircraft carrying said apparatus.

8. Collision warning apparatus comprising, in combination: a scanner continuously sweeping 360 degrees in azimuth; an infrared transducer in said scanner for giving an electrical output determined by the infrared input; a superheterodyne receiver including a tunable local oscillator; means connecting said transducer to said receiver; a demodulator; means connecting said demodulator to said receiver including a band pass filter centered on said intermediate frequency; a cathode ray oscilloscope having a normally circular trace; means connecting said demodulator to said oscilloscope to cause radial displacement of said trace from said circle when said demodulator gives an output; and means tuning said local oscillator in accordance with the altitude of an aircraft carrying said apparatus.

9. Collision warning apparatus comprising, in combination: a scanner continuously sweeping 360 degrees in azimuth; an infrared transducer in said scanner for giving an electrical output determined by the infrared input; a superheterodyne receiver including a tunable local oscillator; means connecting said transducer to said receiver including a notch filter for attenuating signals of the intermediate frequency of said receiver; a demodulator; means connecting said demodulator to said receiver; a cathode ray oscilloscope having a normally circular trace; means connecting said demodulator to said oscilloscope to cause radial displacement of said trace from said circle when said demodulator gives an output; and means tuning said local oscillator in accordance with the altitude of an aircraft carrying said apparatus.

References Cited in the file of this patent

UNITED STATES PATENTS

| | | |
|---|---|---|
| 2,237,193 | Mobsby | Apr. 1, 1941 |
| 2,409,456 | Tolson et al. | Oct. 15, 1946 |
| 2,498,933 | Wallace | Feb. 28, 1950 |
| 2,568,568 | Stansbury | Sept. 18, 1951 |
| 2,842,760 | McLucas | July 8, 1958 |
| 2,886,796 | Wallace | May 12, 1959 |
| 2,895,127 | Padgett | July 14, 1959 |
| 2,943,201 | Hicks et al. | June 28, 1960 |
| 2,975,284 | Osborne | Mar. 14, 1961 |
| 2,980,908 | Vielle | Apr. 18, 1961 |
| 3,025,521 | Tatel et al. | Mar. 13, 1962 |
| 3,038,996 | Grube | June 12, 1962 |
| 3,040,314 | Hesse | June 19, 1962 |

FOREIGN PATENTS

| | | |
|---|---|---|
| 535,188 | Canada | Jan. 1, 1957 |
| 1,173,611 | France | Oct. 27, 1958 |
| 577,226 | Canada | June 9, 1959 |

OTHER REFERENCES

Osborne: "Airborne Infrared Warning System Measures Range," Electronics, July 1, 1957, pp. 190 and 192.

"Infrared to Get Collision Warning Trial," by Philip J. Klass, Aviation Week, August 12, 1957, pp. 77, 79, 81, 83 and 84.